United States Patent
Schmautz et al.

(10) Patent No.: US 8,388,325 B2
(45) Date of Patent: Mar. 5, 2013

(54) PISTON PUMP FOR A VEHICLE BRAKE SYSTEM, HAVING A PISTON ROD

(75) Inventors: Oliver Schmautz, Oberstenfeld (DE); Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 12/446,051

(22) PCT Filed: Sep. 25, 2007

(86) PCT No.: PCT/EP2007/060137
§ 371 (c)(1),
(2), (4) Date: Apr. 17, 2009

(87) PCT Pub. No.: WO2008/046721
PCT Pub. Date: Apr. 24, 2008

(65) Prior Publication Data
US 2010/0215530 A1    Aug. 26, 2010

(30) Foreign Application Priority Data
Oct. 17, 2006   (DE) .......................... 10 2006 048 902

(51) Int. Cl.
*F04B 53/12*    (2006.01)
(52) U.S. Cl. ...................................................... 417/545
(58) Field of Classification Search ........... 417/545–550
See application file for complete search history.

(56) References Cited

U.S. PATENT DOCUMENTS

| 6,514,056 | B1 | 2/2003 | Schuller et al. |
| 7,004,733 | B2 | 2/2006 | Schepp et al. |
| 2002/0155008 | A1* | 10/2002 | Hauser et al. ................. 417/313 |
| 2004/0234400 | A1 | 11/2004 | Schepp et al. |
| 2006/0198738 | A1 | 9/2006 | Schlitzkus et al. |
| 2007/0092389 | A1 | 4/2007 | Dinkel et al. |

FOREIGN PATENT DOCUMENTS

| CN | 101523049 | A | 9/2009 |
| DE | 19918124 | A1 | 10/2000 |
| WO | 03004872 | A1 | 1/2003 |
| WO | 2004072478 | A1 | 8/2004 |
| WO | 2004088137 | A1 | 10/2004 |

* cited by examiner

*Primary Examiner* — Anh Mai
*Assistant Examiner* — Hana Featherly
(74) *Attorney, Agent, or Firm* — Maginot, Moore & Beck

(57) ABSTRACT

The invention relates to a piston pump for a vehicle braking system, having a housing section and a piston that is displacably guided into the housing section. A receiving cap is provided for receiving an inlet valve. A sealing element is connected to the receiving cap for sealing the piston and a piston rod that is joined to the sealing element. The piston rod has a first and a second piston rod element. In the first piston rod element, a fluid inlet for introducing the fluid into the inside of the piston is provided. The second piston rod element partially covers the fluid inlet in the axial direction of the piston.

20 Claims, 3 Drawing Sheets

PISTON PUMP FOR A VEHICLE BRAKE SYSTEM, HAVING A PISTON ROD

CROSS-REFERENCE TO RELATED APPLICATION

This application is a 35 USC 371 application of PCT/EP 2007/060137 filed on Sep. 25, 2007.

BACKGROUND OF THE INVENTION

1. Field of the Invention

The invention relates to a piston pump for a vehicle brake system, having a housing portion and a piston that is guided displaceably in the housing portion.

2. Description of the Prior Art

The piston pumps used for known vehicle brake systems, particularly anti-lock brake systems (ABS), serve to control the pressure in wheel brake cylinders. In an ABS, the piston pumps are provided for instance for returning brake fluid from one or more wheel brake cylinders to a master cylinder. The ABS often works in combination with traction control (TC). Another known system, the so-called electronic stability program (ESP) improves driving safety by a further increment over ABS and TC. While ABS and TC act in the longitudinal travel direction, ESP affects the crosswise dynamics and therefore in principle is transverse slip control. For all these systems as well as further systems to enhance driving safety, piston pumps are employed.

Known piston pumps intended for vehicle brake systems comprise among other things a cylinder embodied in a housing, in which cylinder a piston is longitudinally movably received. The piston drive is usually effected via an eccentric drive, in which the rotary motion of a shaft, driven by means of a drive motor, is converted into a translational motion of a piston rod of the piston. The piston rod is pressed with its face end against the outer circumference of the eccentric element of the eccentric drive by means of a prestressing element, for instance in the form of a helical spring. Thus in the final analysis, a reciprocating pumping motion of the piston can be achieved.

Known piston pumps for controlling the fluid inflow moreover as a rule have an inlet valve embodied as a seat valve. The inflow of fluid from outside the piston pump to the inlet valve is effected in known piston pumps via a comparatively long suction line, which is embodied in the piston rod and has high flow resistance. As a consequence, known piston pumps used for vehicle brake systems do not have sufficiently effective pressure buildup dynamics, since because of the high flow resistance associated with the very long suction line, they can be filled only relatively slowly. Finally, the production of the piston rods of known piston pumps involves an expensive plunge grinding process.

OBJECT AND SUMMARY OF THE INVENTION

The object of the invention is to disclose a piston pump for a vehicle brake system which can be filled quickly in order to attain good pressure buildup dynamics and which can furthermore be produced economically.

This object is attained according to the invention with the piston pump for a vehicle brake system as mentioned at the outset, in which the piston rod is designed in two parts, with a first and a second piston rod element in which a fluid introduction opening for introducing fluid into the interior of the piston is provided in the first piston rod element, and the second piston rod element partially covers the fluid introduction opening in the axial direction of the piston.

According to the invention, the piston rod is designed in two parts, including a first and a second piston rod element. The two-piece design of the piston rod of the invention has the advantage over a one-part design of the piston rod in the prior art that the individual piston rod elements themselves can be produced inexpensively, for instance as a cold-formed part, turned and drilled part, or turned and sawed part, or can be made from a welded tube. In the first piston rod element, a fluid introduction opening for introducing fluid into the interior of the piston is provided. In the invention, a suction line extending along the entire piston rod, as in the known piston pumps that are used for vehicle brake systems, is therefore not provided. Preferably, the fluid introduction opening is designed such that fluid flowing in via the fluid introduction opening can flow into the interior of a piston with the least possible flow resistance. To keep the inflow distance as short as possible, the second piston rod element partially covers the fluid introduction opening in the axial direction of the piston. Overall, it is thus possible according to the invention to furnish a piston pump for a vehicle brake system especially economically that can be filled quickly and therefore has good pressure buildup dynamics.

In an advantageous refinement of the invention, the first piston rod element is retained by means of a press fit on the second piston rod element, on the portion of the piston rod element that partially covers the fluid introduction opening, in order inexpensively to create a solid, durable connection between the two piston rod elements.

In a practical refinement of the invention, the fluid introduction opening is designed by means of a bore radially penetrating the first piston rod element; this bore can be achieved simply and economically without major production effort and expense.

In a further practical refinement of the invention, the fluid introduction opening is designed by means of an axially extending slot radially penetrating the first piston rod element. By means of a fluid introduction opening that is embodied in the form of this kind of slot that can be produced economically, fluid from outside the two-piece piston rod can flow into the interior of the piston with extremely slight flow resistance.

In a further advantageous refinement, the sealing element is embodied integrally with an inlet valve cap. This has the advantage that unlike the piston pumps known from the prior art, the functions of the sealing element and of the inlet valve cap provided for receiving an inlet valve are taken over by only a single component. Thus according to the invention, compared to the known embodiments, one component is dispensed with, and as a consequence the assembly and disassembly of the piston pump of the invention can be done quite simply, and the chain of tolerances is shortened considerably. Moreover, with the elimination of one component achieved according to the invention, the production costs of the piston pump can be reduced markedly. Finally, because of the elimination of one component compared to known pumps, the piston pump of the invention can be made markedly smaller.

In an advantageous refinement of the invention, the inlet valve has a valve seat that is embodied on the piston rod. This structural achievement according to the invention makes simple assembly and disassembly of the piston pump possible. For disassembling the piston pump, for instance, the piston rod adjoining the sealing element must be removed from the sealing element. Next, the inlet valve, which is preferably embodied as a seat valve, along with its individual components for instance including a blocking body and a spring element, can be removed without major effort from the inlet valve cap embodied integrally with the sealing element. The sealing element received longitudinally movably in the cylinder of the piston pump, with which sealing element the inlet valve cap is embodied integrally, can finally be removed from the cylinder without problems.

In a further advantageous refinement of the invention, a prestressing element, preferably in the form of a helical spring, is provided which rests on the sealing element and with which the piston is forced in the direction out of the housing portion. The prestressing force transmitted to the sealing element from the prestressing element keeps the piston always in its outer position. In this way, according to the invention, the outer face end of the piston can be pressed against the eccentric element of an eccentric drive, so as to convert a translational driving motion, furnished by the eccentric drive, into a reciprocating pumping motion of the piston. By means of the prestressing element, the piston pump of the invention can be used in conjunction with eccentric drives that are preferably employed in brake systems for driving the piston pumps.

In a practical refinement of the invention, the sealing element is embodied in the form of a sealing ring with a sealing ring opening, and the piston rod is received in the sealing ring opening, and the piston rod is preferably received in the sealing ring opening with a clearance fit. By means of a clearance fit, the piston rod can easily be centered in the sealing ring opening. A clearance fit also makes easy release of the piston rod from the sealing ring opening possible, which is necessary for the sake of disassembly.

In a further advantageous refinement of the invention, between the sealing element and the piston rod, a snap connection is embodied, for preassembling the piston rod on the sealing element. The snap connection, which is preferably embodied on the sealing element, for instance fits around a shoulder embodied on the piston rod. By means of the snap connection of the invention, the piston rod can be retained on the sealing element via the snap function furnished according to the invention during the assembly of the piston pump, and in particular during its assembly on the cylinder. Also by means of the snap connection of the invention, the inner wall of the cylinder housing is protected from the outside of the piston. Thus by means of the snap connection of the invention, any possible contact of the piston with the inner wall of the cylinder housing is precluded, thereby preventing damage to the inner wall of the cylinder housing or to the piston.

BRIEF DESCRIPTION OF THE DRAWINGS

Below, exemplary embodiments of a piston pump of the invention will be described in further detail in conjunction with the accompanying schematic drawings, in which.

DESCRIPTION OF THE PREFERRED EMBODIMENTS

Figure 1:
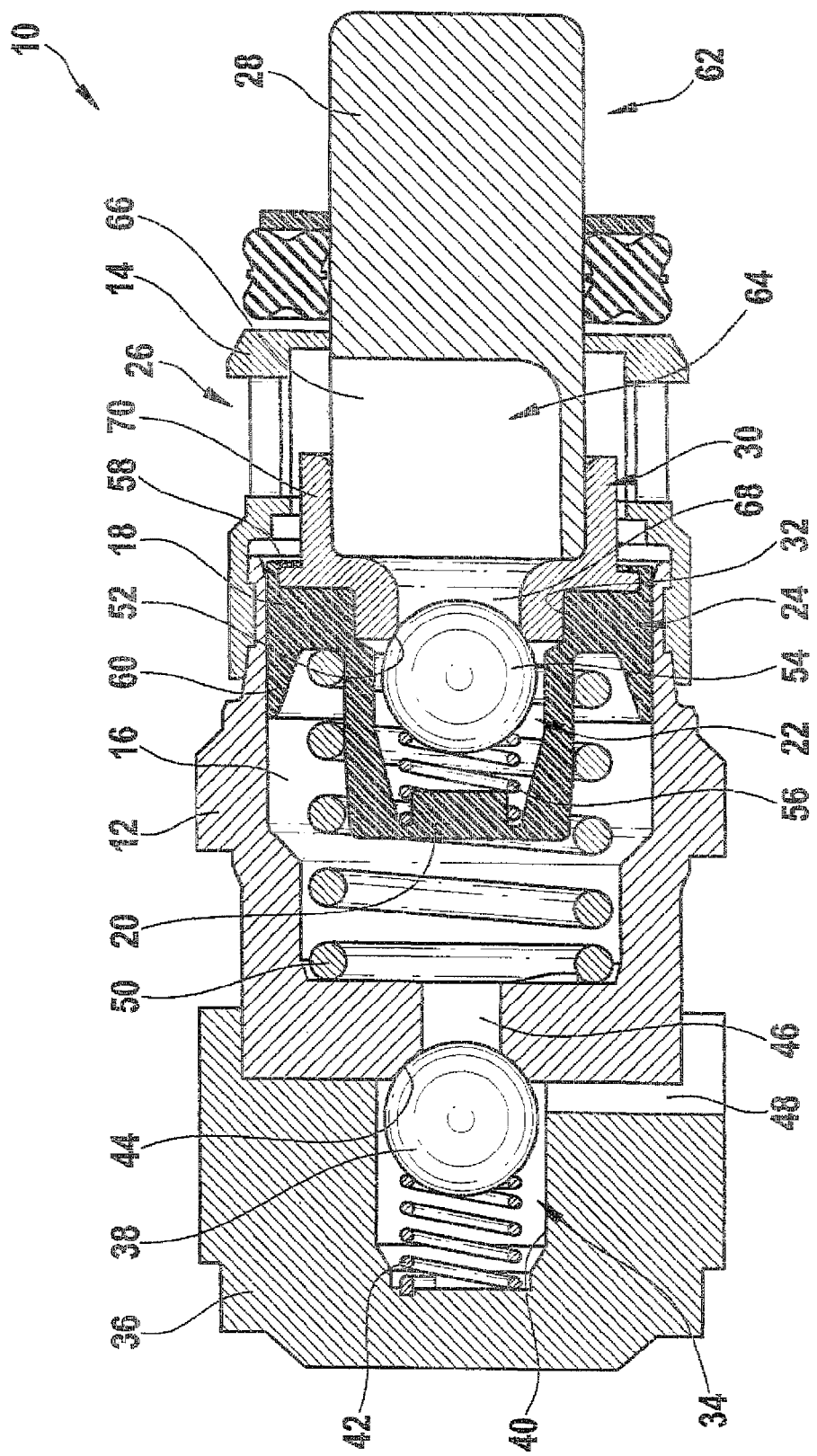
FIG. 1 is a longitudinal section through a piston pump of the invention.

FIG. 1 shows a piston pump 10 of the invention, which includes two housing portions 12 and 14; in the housing portion 12, a cylinder bore 16 is embodied in which a piston 26 is guided displaceably. The piston 26 includes a sealing element in the form of a sealing ring 18, a receiving means 20 for an inlet valve 22 embodied as a ball seat valve, which is embodied integrally with the sealing ring 18 and in the present case is embodied as an inlet valve cap, and a piston rod 62, which adjoins the sealing ring 18. The piston rod 62 is embodied in two parts and includes two piston rod elements 28, 30; the piston rod element 28 is received solidly by means of a press fit in the piston rod element 30, in order to create a connection by nonpositive engagement between the two piston rod elements 28, 30. Because of the two-piece embodiment provided for the piston rod 62, a piston rod 62 that is inexpensive to produce can be attained, since according to the invention, an inexpensive rodlike piston rod element 28 is joined to a piston rod element 30 which can be furnished quite economically in the form of a plastic injection-molded part, a turned part, a cast part, or a cold-formed part. Also especially inexpensively, a fluid introduction opening 64 to be described in further detail hereinafter may be embodied in the piston rod element 28.

The receiving means 20, designed as an inlet valve cap, and the sealing ring 18 together form a one-piece valve cap/sealing ring combination 24. The piston rod element 30, for joining the piston rod 62 to the sealing ring 18, is received in the sealing ring opening 32 of the sealing ring 18.

The piston pump 10 furthermore has an outlet valve 34, which is embodied as a ball seat valve and disposed inside an outlet valve cap 36; a ball 38 of the ball seat valve 34 is guided in a receptacle 40 embodied in the outlet valve cap 36. The outlet valve cap 36 may be made in part by metal-cutting machining or cold-forming. A helical spring 42 braced on the cap bottom presses the ball 38 against a valve seat 44, which is embodied in the housing portion 12 of the piston pump 10 and adjoins an outlet hole 46 embodied in the housing portion 12. Brake fluid flowing from the outlet hole 46 through the outlet valve 34 flows in the direction of the pump outlet (not shown) via a radial conduit 48 between the outlet valve cap 36 and the housing portion 12.

In the cylinder bore 16 embodied in the housing portion 12, a prestressing element in the form of a helical spring 50 is also disposed, which rests with one end on the sealing ring 18 and with the other end is braced on the bottom of the housing portion 12. The helical spring 50 is prestressed, in order to press the two-piece piston rod 62 against the circumference of the eccentric element of an eccentric drive (not shown), by way of the sealing ring 18, on which the piston rod 62 rests with its face end disposed inside the piston pump 10. Thus the outer face end of the piston rod element 28 can be kept always in contact with the eccentric element. Driving the eccentric element to rotate drives the entire piston 26 to execute an axially reciprocating stroke motion, which in a known manner results in pumping of brake fluid.

The valve seat 52 of the ball inlet valve 22, which can be made for instance by ball embossing or stamping, is embodied on the face end on the piston rod element 30. This embodiment according to the invention of the valve seat 52 on the piston rod element 30 of the piston rod 62, in combination with the integral embodiment, according to the invention, of the sealing ring 18 with the receiving means 20, designed as an inlet valve cap, in the form of the valve cap/sealing ring combination 24 offers considerable advantages in the assembly and disassembly of the piston pump 10. For disassembly of the piston pump 10, the piston rod element 30, received with a clearance fit in the sealing ring opening 32, has to be pulled out of the sealing ring opening 32. The clearance fit provided according to the invention makes problem-free release of the piston rod element 30 from the sealing ring 18 possible here. The individual components of the inlet valve 22, that is, the ball 54 and the helical spring 56, can then be easily removed from the receiving means 20. Finally, after the valve cap/sealing ring combination 24, embodied in one piece, has been pulled out of the cylinder bore 16, the helical spring 50 can be removed from the cylinder bore 16. The assembly of the piston pump 10 is correspondingly simple; the clearance fit provided makes problem-free centering of the piston rod element 30 in the sealing ring opening 32 possible.

Also on the sealing ring 18, a snap connection in the form of a snap pawl 58 is embodied, which fits around a shoulder embodied on the piston rod element 30. By means of the snap pawl 58, the piston rod 62 can be retained on the sealing ring 18 during the assembly of the piston pump 10, and in particular during its installation on the cylinder bore 16, and as a result the assembly of the piston pump 10 of the invention is simplified considerably. The retention function thus attained according to the invention can alternatively be implemented by means of thermal deformation after the valve cap/sealing ring combination 24 has been slipped onto the piston rod element 30. According to the invention, the snap pawl 58 takes on only the described retention function that is advantageous for assembly purposes. During the operation of the piston pump 10, the spring force of the helical spring 50 assures that the valve cap/sealing ring combination 24 rests permanently, despite the clearance fit that is advantageous for assembly purposes, on the piston rod element 30 in the axial direction. Moreover, the snap pawl 58 has a protective effect between the cylinder bore 16 and the piston rod element 30. A sealing lip 60 is also embodied on the sealing ring 18 of the valve cap/sealing ring combination 24 and closes off the cylinder chamber between the piston 26 and the cylinder bore 16 radially in pressure-tight fashion.

In the piston rod element 28, a fluid introduction opening 64 is provided for introducing fluid into the interior of the piston 26; this opening is embodied here in the form of a slot 66 that is radially open on one end and extends in the axial direction. By means of the slot 66, fluid from outside the piston rod element 28 can flow into the interior of the piston 26 with extremely slight flow resistance. After flowing through the slot 66, the fluid flows into an axially extending opening 68, which is embodied in the piston rod element 30 and extends as far as the inlet valve 22. According to the invention, both the slot 66 and the opening 68 are made quite large, to minimize the flow resistance. The piston pump 10 of the invention can thus be filled quickly, and as a result good pressure buildup dynamics can be achieved.

The second piston rod element 30 partially covers the fluid introduction opening 64 in the axial direction of the piston 26. In this way, according to the invention, the flow distance can be kept as short as possible, in order to create the least possible flow resistance. The first piston rod element 28 is retained by means of a press fit on the second piston rod element 30, on the portion 70 of the second piston rod element 30 that partially covers the fluid introduction opening 64.

Figure 2A:
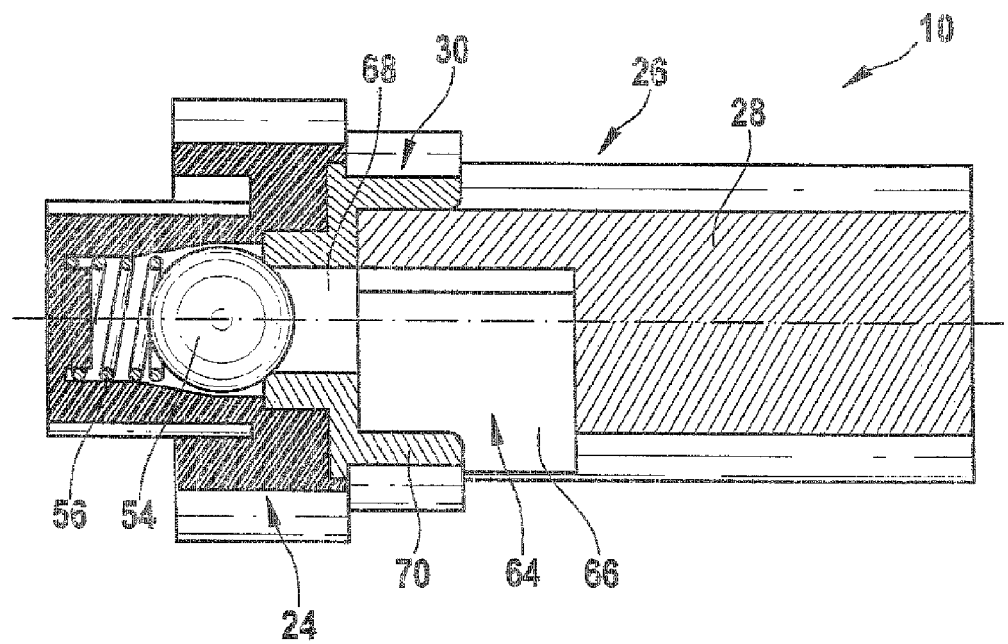
FIG. 2a is a fragmentary quarter section through a further piston pump of the invention, with a slotted piston.
Figure 2B:
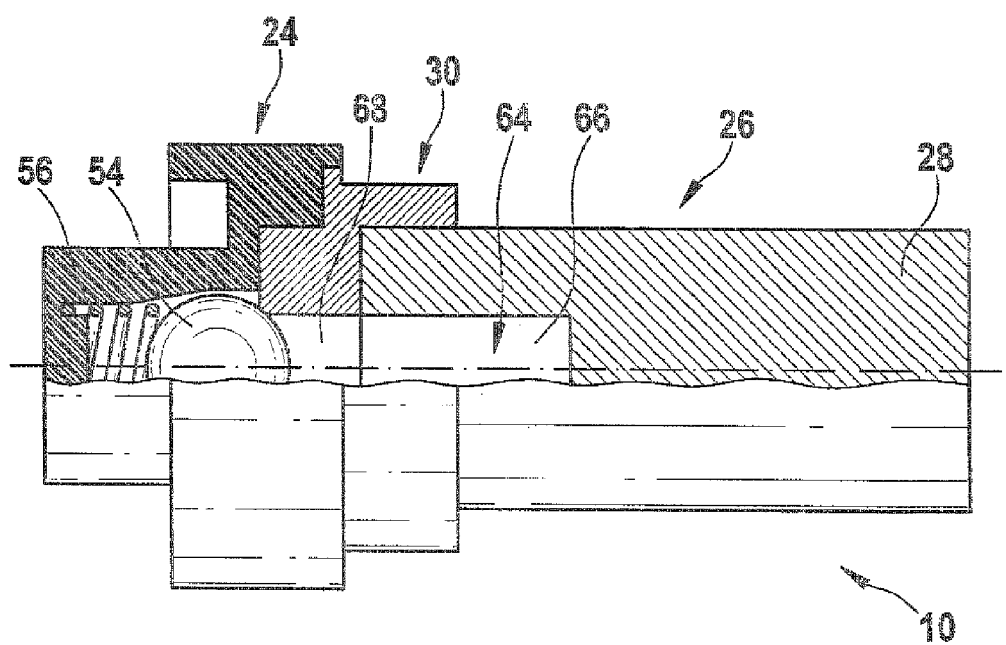
FIG. 2b shows the fragmentary quarter section of FIG. 2a in a position of the piston pump of the invention rotated by 45°.

FIGS. 2a and 2b show quarter-sectional views of a further piston pump 10 according to the invention, with a likewise slotted piston 26.

The slot 66 embodied in the piston 26 of FIGS. 2a and 2b penetrates the piston rod element 28 diametrically, and in the case of this piston pump 10 as well makes very fast filling of the interior of the piston 26 possible. Also here, the second piston rod element 30, with a covering portion 70, partially covers the fluid introduction opening 64 in the form of the slot 66 in the axial direction of the piston 26.

Figure 3A:
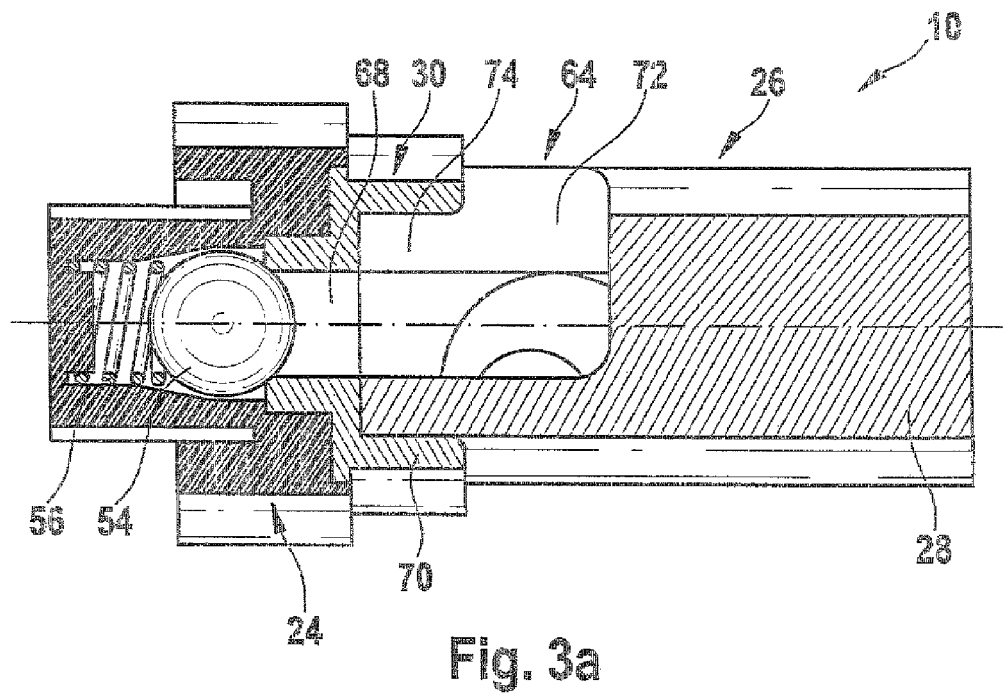
FIG. 3a shows a fragmentary quarter section of a further piston pump of the invention with a drilled piston.
Figure 3B:
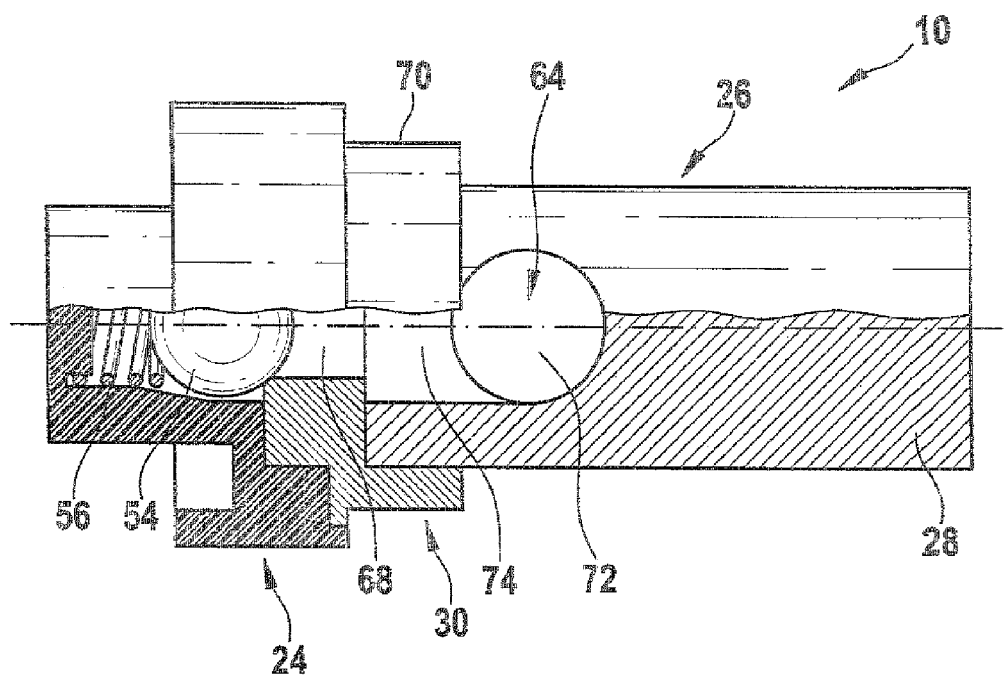
FIG. 3b shows the fragmentary quarter section of FIG. 3a in a position of the further piston pump of the invention rotated by 45°.

FIGS. 3a and 3b show sectional views of a further piston pump of the invention, with a drilled piston 26.

In this embodiment of the invention, the fluid introduction opening 64 is designed in the form of a radial bore 72, diametrically penetrating the piston rod element 28, and a second, axial bore 74 extending transversely to the radial bore. FIG. 3b in particular, whose sectional faces are rotated by 45° compared to the sectional faces of FIG. 3a, shows how the radial bore 72 is partially covered by a covering portion 70 of the piston rod element 30.

The foregoing relates to the preferred exemplary embodiments of the invention, it being understood that other variants and embodiments thereof are possible within the spirit and scope of the invention, the latter being defined by the appended claims.

The invention claimed is:

1. A piston pump for a vehicle brake system, comprising:
a housing portion;
a piston guided displaceably in a cylinder bore of the housing portion;
an inlet valve cap for receiving an inlet valve, the valve cap having a radially outward extending sealing element directly contacting an inner wall of the housing portion for sealing off the piston from the housing portion; and
a piston rod adjoining the sealing element, the piston rod being embodied in two parts, with a first piston rod element and a second piston rod element,
wherein the second piston rod element adjoins the sealing element and the first piston rod element adjoins the second piston rod element, and
wherein a fluid introduction opening for introducing fluid into the interior of the piston is provided in the first piston rod element, and a covering portion of the second piston rod element partially covers the fluid introduction opening in an axial direction of the piston.

2. The piston pump as defined by claim 1, wherein the first piston rod element is retained by a press fit on the covering portion of the second piston rod element that partially covers the fluid introduction opening.

3. The piston pump as defined by claim 2, wherein the fluid introduction opening is embodied by a bore that radially penetrates a circumferential surface of the first piston rod element.

4. The piston pump as defined by claim 2, wherein the fluid introduction opening is embodied by a slot, extending in the axial direction, that radially penetrates a circumferential surface of the first piston rod element.

5. The piston pump as defined by claim 1, wherein the fluid introduction opening is embodied by a bore that radially penetrates a circumferential surface of the first piston rod element.

6. The piston pump as defined by claim 1, wherein the fluid introduction opening is embodied by a slot, extending in the axial direction, that radially penetrates a circumferential surface of the first piston rod element.

7. The piston pump as defined by claim 1, wherein the sealing element is embodied integrally with the inlet valve cap.

8. The piston pump as defined by claim 7, wherein the inlet valve has a valve seat, which is embodied on the second piston rod element.

9. The piston pump as defined by claim 8, further comprising a prestressing element in the form of a helical spring which rests on the sealing element and forces the piston in a direction out of the housing portion.

10. The piston pump as defined by claim 8, wherein the sealing element is embodied in the form of a sealing ring with a sealing ring opening, and the second piston rod element is received in the sealing ring opening.

11. The piston pump as defined by claim 8, wherein a snap connection is embodied between the sealing element and the second piston rod element for preassembling the piston rod on the sealing element.

12. The piston pump as defined by claim 10, wherein the second piston rod element is received in the sealing ring opening with a clearance fit.

13. The piston pump as defined by claim 7, further comprising a prestressing element in the form of a helical spring which rests on the sealing element and forces the piston in a direction out of the housing portion.

14. The piston pump as defined by claim 13, wherein the sealing element is embodied in the form of a sealing ring with a sealing ring opening, and the second piston rod element is received in the sealing ring opening.

15. The piston pump as defined by claim 14, wherein the second piston rod element is received in the sealing ring opening with a clearance fit.

16. The piston pump as defined by claim 7, wherein the sealing element is embodied in the form of a sealing ring with a sealing ring opening, and the second piston rod element is received in the sealing ring opening.

17. The piston pump as defined by claim 16, wherein the second piston rod element is received in the sealing ring opening with a clearance fit.

18. The piston pump as defined by claim 8, wherein a snap connection is embodied between the sealing element and the second piston rod element for preassembling the piston rod on the sealing element.

19. The piston pump as defined by claim 7, wherein a snap connection is embodied between the sealing element and the second piston rod element for preassembling the piston rod on the sealing element.

20. The piston pump as defined by claim 19, wherein the second piston rod element is embodied with a shoulder and the snap connection is embodied on the sealing element in the form of a snap pawl that fits around the shoulder on the second piston rod element and precludes contact of the piston with the inner wall of the housing portion.

* * * * *

UNITED STATES PATENT AND TRADEMARK OFFICE
CERTIFICATE OF CORRECTION

PATENT NO. : 8,388,325 B2
APPLICATION NO. : 12/446051
DATED : March 5, 2013
INVENTOR(S) : Schmautz et al.

It is certified that error appears in the above-identified patent and that said Letters Patent is hereby corrected as shown below:

In the claims:

Claim 18, line 1 (col. 8, line 6):

Replace "as defined by claim 8, wherein" with -- as defined by claim 16, wherein --

Signed and Sealed this
First Day of October, 2013

Teresa Stanek Rea
*Deputy Director of the United States Patent and Trademark Office*